United States Patent
Seaman et al.

(10) Patent No.: US 9,939,033 B2
(45) Date of Patent: Apr. 10, 2018

(54) BIASED PLUNGER ARRANGEMENT FOR A BRAKE PAD RETENTION SYSTEM

(71) Applicant: Bendix Spicer Foundation Brake LLC, Elyria, OH (US)

(72) Inventors: James Seaman, Avon, OH (US); Kyle Swansegar, Lakewood, OH (US)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 0 days.

(21) Appl. No.: 15/152,131

(22) Filed: May 11, 2016

(65) Prior Publication Data
US 2017/0328426 A1 Nov. 16, 2017

(51) Int. Cl.
F16D 65/00 (2006.01)
F16D 65/097 (2006.01)
F16D 55/225 (2006.01)

(52) U.S. Cl.
CPC ..... *F16D 65/0006* (2013.01); *F16D 65/0973* (2013.01); *F16D 55/225* (2013.01); *F16D 2250/0084* (2013.01)

(58) Field of Classification Search
CPC ............. F16D 65/0006; F16D 65/0973; F16D 65/0978; F16D 65/092
USPC .......... 188/72.3, 73.36–73.39, 250 B, 250 C, 188/250 D, 250 G
See application file for complete search history.

(56) References Cited

U.S. PATENT DOCUMENTS

| 2,942,834 A | * | 6/1960 | Clark | F16F 3/10 267/140.11 |
| 4,055,368 A | * | 10/1977 | Sogge | B62D 55/096 267/152 |
| 4,445,594 A | * | 5/1984 | Hoffman, Jr. | F16D 55/224 188/234 |
| 6,223,866 B1 | * | 5/2001 | Giacomazza | F16D 55/227 188/73.36 |
| 6,378,665 B1 | | 4/2002 | McCormick et al. | |
| 6,427,810 B2 | * | 8/2002 | Schorn | F16D 65/0979 188/73.38 |

(Continued)

FOREIGN PATENT DOCUMENTS

| DE | 40 32 886 A1 | | 4/1992 | |
| GB | 2395534 | * | 5/2004 | F16D 65/097 |

OTHER PUBLICATIONS

U.S. Appl. No. 14/939,748, filed Nov. 12, 2015.

*Primary Examiner* — Christopher P Schwartz
(74) *Attorney, Agent, or Firm* — Crowell & Moring LLP

(57) ABSTRACT

A system is provided for suppressing undesired brake pad motion during brake application, and for installing and removing brake pads utilizing the inventive arrangements. The brake pads and a carrier mount having complementary surface features that retain the brake pad when the brake pad is in its installed position, and a brake pad biasing structure that biases the brake pad in the radially outward direction to bias the contact faces of the mount horn and the brake pad against one another to suppress brake pad kick and vibration and related wear and component fatigue. The radially-outward biasing force may be applied by a spring-loaded plunger located within a bore of a mount horn of the brake pad carrier against a radially-inner surface of a portion of the brake pad extending laterally over the mount horn.

20 Claims, 9 Drawing Sheets

(56) References Cited

U.S. PATENT DOCUMENTS

| | | | |
|---|---|---|---|
| 6,494,301 B1 * | 12/2002 | Wirth | F16D 65/062 |
| | | | 188/259 |
| 7,152,717 B2 * | 12/2006 | Lelievre | F16D 65/0006 |
| | | | 188/250 E |
| 8,020,674 B2 * | 9/2011 | Miura | F16D 65/0972 |
| | | | 188/73.38 |
| 8,235,184 B2 * | 8/2012 | Matsushima | F16D 65/092 |
| | | | 188/250 B |
| 9,097,304 B2 | 8/2015 | Plantan et al. | |
| 2007/0246312 A1 | 10/2007 | Bach et al. | |
| 2009/0078513 A1 * | 3/2009 | Redemann | F16D 55/02 |
| | | | 188/73.39 |
| 2012/0298454 A1 | 11/2012 | Plantan | |
| 2015/0008079 A1 | 1/2015 | Eichler et al. | |
| 2015/0008080 A1 | 1/2015 | Baumgartner et al. | |
| 2015/0014103 A1 | 1/2015 | Radhakrishnan et al. | |

* cited by examiner

BIASED PLUNGER ARRANGEMENT FOR A BRAKE PAD RETENTION SYSTEM

BACKGROUND AND SUMMARY OF THE INVENTION

The present invention relates to disc brakes for vehicles, and in particular to a system for retaining brake pads in disc brakes, such as air-operated disc brakes utilized on commercial vehicles.

Pneumatically-operated disc brakes have been undergoing development and deployment on commercial vehicles since at least the 1970's, and are beginning to replace drum-style brakes due to advantages in areas such as cooling, fade resistance and serviceability. German Patent Publication No. DE 40 32 886 A1, and in particular FIG. 1 of this document, discloses an example of such an air disc brake. In this design, a pneumatic diaphragm chamber (pneumatic actuator) is attached to a rear face of the disc brake caliper housing, and applies a brake actuation force through a linear actuator rod to a brake actuator lever within the caliper. The brake's actuator lever in turn transfers and multiplies the force applied by the actuator rod to one or more spindles, which force brake pads against a brake disc or rotor. The terms "brake disc," "rotor" and "brake rotor" are used interchangeably herein.

In applications such as commercial vehicles, wheel rims have historically been sized to only provide adequate clearance for the drum-type brakes historically employed on such vehicles. Because the resulting space envelope between the wheel and its axle is limited, the outer radius of the brake caliper, brake pads and any brake pad retention devices must conform to the limited available radial space. Brake pads typically have been located and retained on one of the brake caliper or brake caliper carrier/mount using transverse suspension pins and/or using leaf spring-type metal strips disposed over the outer radius of the brake pads. Brake pads have also been retained by capturing the brake pads between the caliper mounting frame and the portion of the brake caliper which straddles the brake disk. As one of ordinary skill will recognize, the same brake pad support function may be provided by a brake caliper carrier/mount designed to support the brake pads or by a brake pad carrier which is separate from the caliper mounting structure. For convenience in this description, the terms caliper carrier, caliper mount and brake pad carrier may be interchanged without intending to limit the brake pad supporting structure to any specific brake pad and brake caliper carrying structure.

A problem with the previous brake pad retention approaches is their tendency to allow the brake pad to rotate about an axis parallel to the brake disc rotation axis during brake application. This in-place rotation is referred to as "pad kick," a motion that can generate undesired brake application noise due to brake pad vibrations, increase fatigue damage to the typical over-pad leaf spring retainer, and increase wear and damage to the brake pad and/or brake caliper mounting structure. An illustration of pad kick is provided in FIG. 10. When a brake pad 101 is applied against a friction surface of a brake disk (not illustrated) which is rotating in direction DR, the brake disk's rotation induces motion and reaction forces between the brake pad 101 and its adjacent mount abutment surfaces (not illustrated). At the leading edge 102 of the brake pad the brake pad attempts to move upward in direction LU in response to the friction forces along the face of the brake pad (illustrated here by force arrows across the face of brake pad 101). At the trailing edge 103 of the brake pad, the brake pad attempts to move downward in direction TD. However, because the brake pad 101 is constrained by adjacent mount abutment surfaces, the overall motion of the brake pad is generally a rotation about an axis parallel to the brake disk rotation axis. This motion may be unilateral during the brake application, or may manifesting itself as a moderate-to-severe oscillation of the brake pad in its mount, significantly increasing wear of the abutting brake pad and mount surfaces.

One approach to addressing these and other problems is disclosed in U.S. patent application Ser. No. 14/939,748, which teaches a brake pad mounting and retention arrangement and method of installation and removal in which one or both of the brake pads is pulled upward (i.e., radially outward) by a spring reaction bar and springs over each brake pad. This approach biases surface features at the lateral sides of the brake pad against the undersides (i.e., radially inner sides) of corresponding surface features of the brake pad carrier structure.

The present invention further minimizes the radial height required to provide the desired radially outward biasing of the brake pad. This is accomplished by incorporating at least one brake biasing feature into the structure of the brake pad carrier (also referred to as a carrier mount or carrier frame) in the carrier's brake pad support abutments adjacent to the lateral sides of the brake pad, for example, in the pad carrier mount horns adjacent to the brake pad. The biasing features apply an upward biasing force to corresponding force-receiving features of the brake pad, such as short projections extending laterally from the sides of the brake pad.

In a preferred embodiment, two biasing features are present in the form of spring-loaded plungers that are inset into corresponding bores in the carrier horns, positioned to apply upward biasing forces to the corresponding brake pad lateral projections. The biasing plungers may take any shape that permits their reliable upward movement, i.e., without twisting sideways in their bores to the point of jamming in the bore. For ease of assembly and low manufacturing cost, preferably the biasing plungers and their corresponding bores are generally cylindrical (although any suitable shape may be used).

The biasing plungers and the brake pads should be sufficiently wide in the direction parallel to the brake disc rotation axis to ensure that at least a portion of the biasing plunger remains under at least a portion of the brake pad lateral projection over the course of the brake pad life, i.e., from new brake pad friction material thickness to the friction material minimum thickness wear limit. This arrangement is desired to ensure that the plungers continue to provide the desired upward biasing force on the brake pad as the pad friction material wears.

In a further embodiment of the invention, the biasing plunger and/or the corresponding bore in which the plunger is received may be provided with a groove configured to receive a sealing element, such as an O-ring. The O-ring would assist in preventing, or at least minimizing, the accumulation of water and/or debris if the receiving bore is formed as a blind hole. Preferably the tolerances of the groove and the sealing element are controlled to exclude debris, while permitting the passage of air to the extent needed to avoid forming a vacuum beneath the biasing plunger that would inhibit the application of upward biasing force to the brake pad.

The biasing arrangements of the present invention may also include laterally-oriented retaining pins arranged to engage the brake pad biasing plungers from the side in order to remove the biasing forces of the plungers from the brake pad down during pad installation and removal The integrated upward biasing features of the present invention may be incorporated into either or both of the outboard and inboard sides of the brake pad carrier. Incorporating these features into the inboard side (the side on which the brake application portion of the brake caliper is located) is particularly advantageous, significantly reducing the vertical space otherwise required to accommodate a brake pad biasing structure above the brake pad.

Other objects, advantages and novel features of the present invention will become apparent from the following detailed description of the invention when considered in conjunction with the accompanying drawings.

DETAILED DESCRIPTION OF THE DRAWINGS

Figure 1:
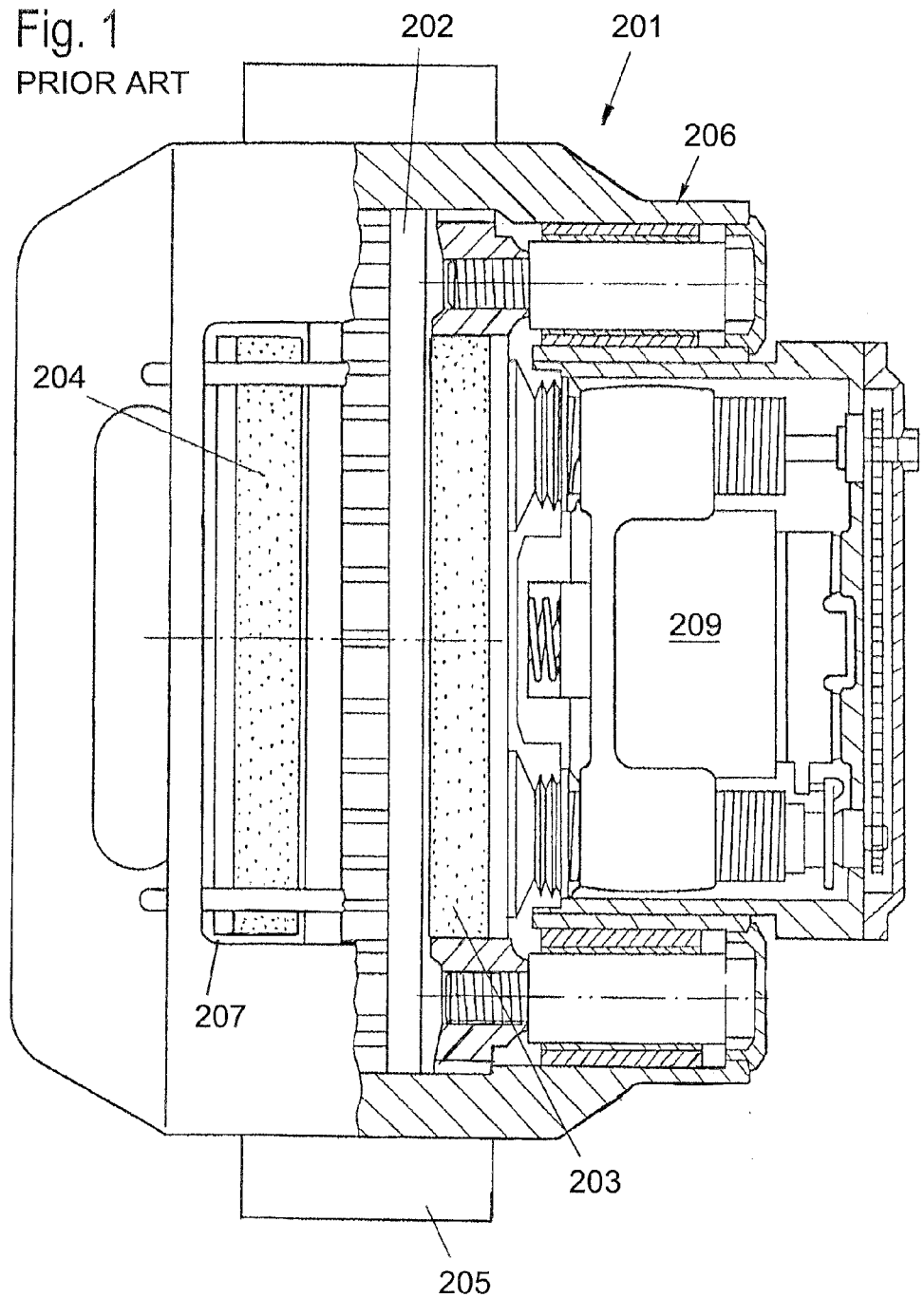
FIG. 1 is an oblique view of a disc brake in accordance with an embodiment of the present invention.

In the embodiment shown FIG. 1, a disc brake 201 of a commercial vehicle includes a brake disk 202, a brake caliper 206 straddling the brake disc 202, and brake pads 203, 204 located on opposite sides of the brake disc 202. The caliper 206 is affixed to a carrier mount 205 which in turn is fixed to a vehicle axle, typically via a torque plate or a brake spider (not illustrated). The caliper 206 is actuated by an actuator (not illustrated) applying a brake application force to a brake pad application mechanism 209 within a brake application-side of the brake caliper 206, which in turn presses the brake pads 203, 204 against the brake disk 202 to slow the vehicle. The present invention is not restricted to a particular type of brake actuator, for example, a pneumatic actuator or an electrically-driven actuator may be used. Nor is the invention limited to a particular type of brake caliper mount arrangement. For example, the brake caliper may be mounted in a fixed manner on a carrier or may be a sliding caliper.

In this embodiment the caliper 203 is provided with an aperture 207 which is wide enough in the circumferential direction x and the axial direction y to permit the brake pads 203, 204 to be withdrawn and inserted without removal of the caliper 206 from the carrier mount 205.

Figure 2:
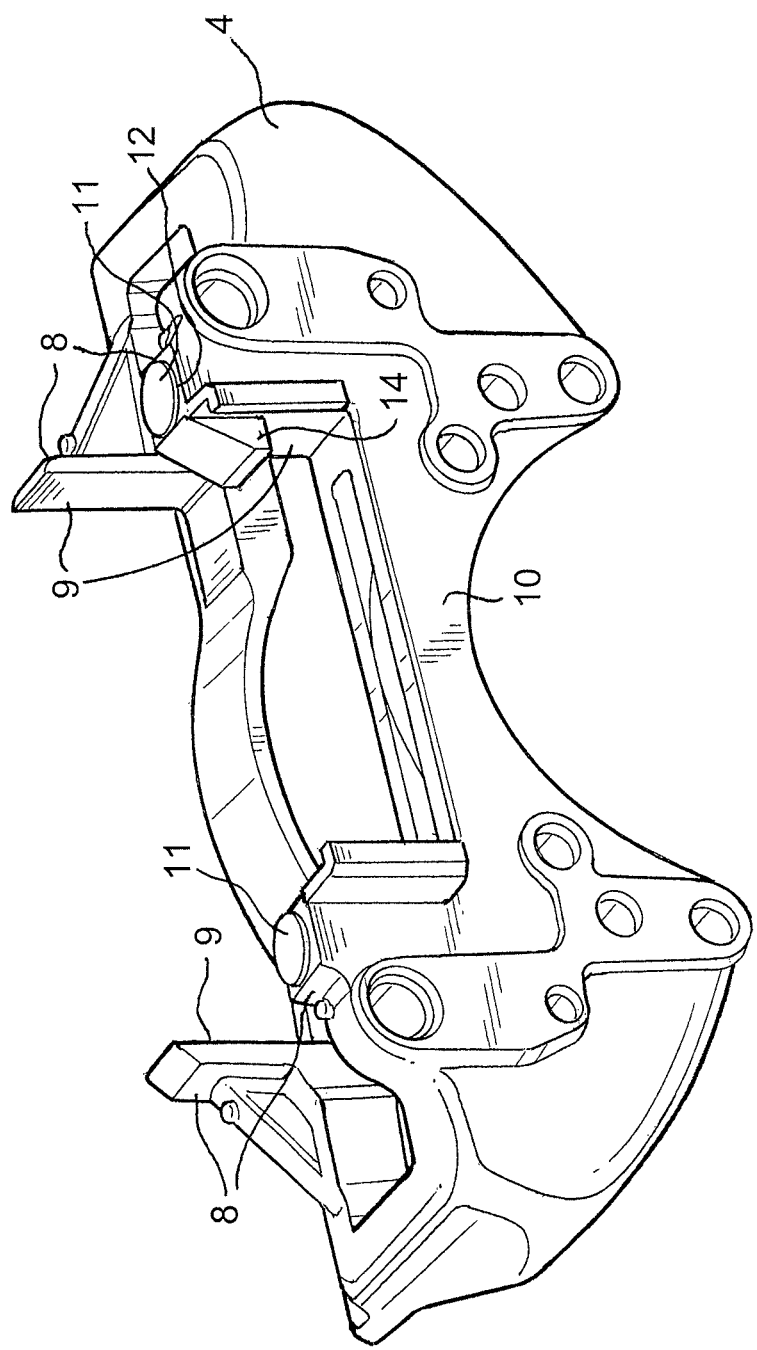
FIG. 2 is an oblique view of a brake pad carrier in accordance with the present invention.
Figure 4:
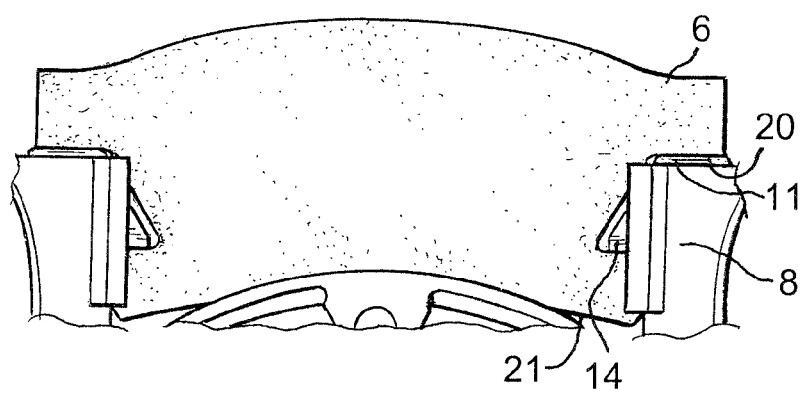
FIG. 4 is an elevation view of the brake pad carrier in FIG. 2 with an installed brake pad.

FIG. 2 is an oblique view of a caliper mounting carrier 4 in accordance with the present invention. The carrier 4 includes mount horns 8 with brake pad abutment surface features 9. In this embodiment the mount horns 8 on the inboard side 10 (aka "application side") of the carrier 4 include brake pad upward-biasing plungers 11 in vertical bores 12. The upward-biasing plungers 11 apply an upward biasing force to the undersides of lateral surfaces 20 of the brake pad 6 which extend over the mount horns 8, as shown in FIG. 4. The upward biasing forces applied by the plungers 11 are countered by the interaction of lower lateral tabs 21 of the brake pad 6 which engage the undersides of corresponding abutment surface wedges 14 (the abutment surface wedges 14 being arranged to retain the brake pad in the brake pad carrier 4 against movement in the radially outward direction). The wedges are generally shaped at about 30 degrees so as to maximize the available pad area, while providing structural support for the wedge itself.

Figure 3:
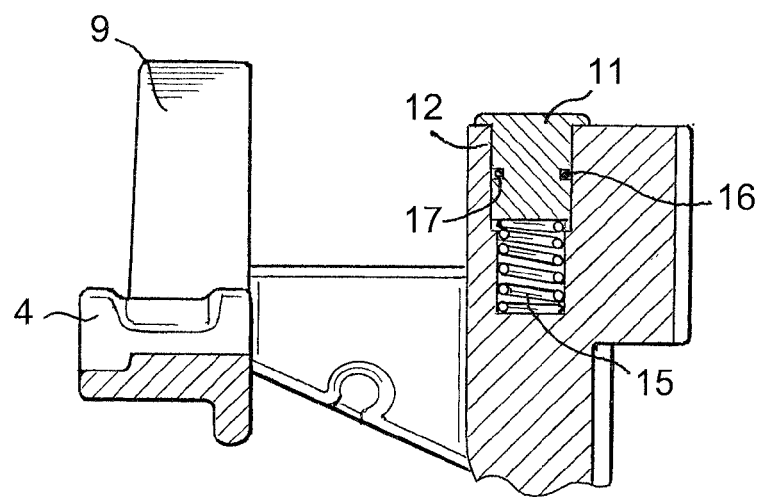
FIG. 3 is an elevation cross-section view of the caliper mounting carrier in FIG. 2.

FIG. 3 is an elevation cross-section detail view of the upward-biasing plunger arrangement of FIG. 2. In this embodiment the plunger 11 within bore 12 is biased outwards by a spring 15, such as a coil spring (shown), a wave spring or a disc spring. Alternatively, a compressible fluid may be used to provide the upward bias. The plunger 11 also is provided with an O-ring 16 within a plunger groove 17. The O-ring 16 is designed to be water-tight to inhibit water and debris entry into the bore when exposed to the environment during vehicle operation, but is preferably not air-tight in order to avoid developing a vacuum within the portion of the bore 12 containing the spring 15 that might reduce the plunger 11's biasing force or inhibit the plunger's ability to be compressed into the bore 12, for example during brake pad changes. Alternatively, the portion of the bore 12 containing the spring 15 may be vented in a manner that would permit accumulated water and/or debris to pass out of the bore 12, thereby ensuring a plunger operation-inhibiting vacuum is not formed. The O-ring also holds the plunger in the carrier through friction when the pad is not present. The bore could be square shaped to receive a square shaped plunger to provide extra torsional resistance. The plunger does not encompass the full width of the carrier horn as this will allow the brake pad tooth (bottom feature) to partially engage before the plunger is engaged. In other words, the diameter of the plunger is less than the width of the horn. The height of plunger preferably is a two to one ratio to the diameter of the plunger to prevent non-vertical loading, but in any event is tall enough to ensure radial biasing of the brake pad. The plunger may include a chamfer on the head to ease installation. Further embodiments may include the plunger and the brake pad lateral surface having a rib and a corresponding groove to receive the rib toleranced to limit uneven pad wear. Alternatively, the lateral surface of the brake pad may have an indentation that would receive the top of the plunger when engaged, or an indented plunger configured to receive a projection from the brake pad lateral surface.

Figure 5:
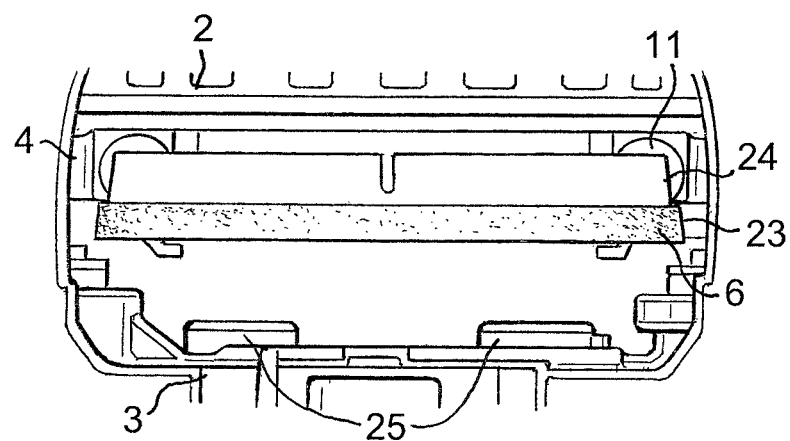
FIG. 5 is a plan view during brake pad installation of a brake pad in the brake pad carrier in FIG. 2.
Figure 6:
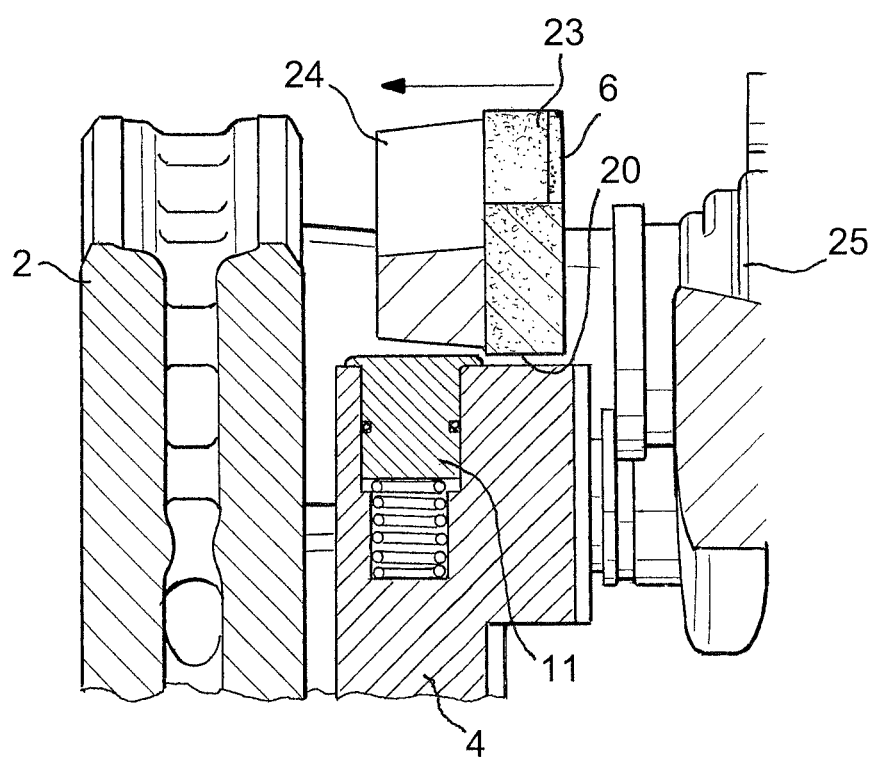
FIG. 6 is an elevation cross-section view of the brake pad installation in FIG. 5.

FIGS. 5 and 6 illustrate a portion of the method of installation of the brake pad 6 in the FIG. 2 brake pad carrier 4. In this embodiment the brake application device 25 is withdrawn axially away from the brake disc 2 (i.e., in the direction parallel to the brake disc rotation axis) a distance sufficient to permit the inboard ("application-side") brake pad 6, having brake pad backing plate 23 supporting brake pad friction material 24, to be inserted in the radially-inward direction between the brake pad carrier 4 and the brake application device 25 of caliper 3. Upon reaching the tops of and depressing the plungers, the brake pad 6 is then advanced axially toward the brake disc 2 to engage in the slots below abutment surface wedges 14 and pass over the tops of the biasing plungers 11. In FIGS. 5 and 6 the brake pad 6 is shown at a mid-installation position, having been inserted radially into the brake and partially advanced axially, having not yet reached the biasing plungers 11.

Figure 7:
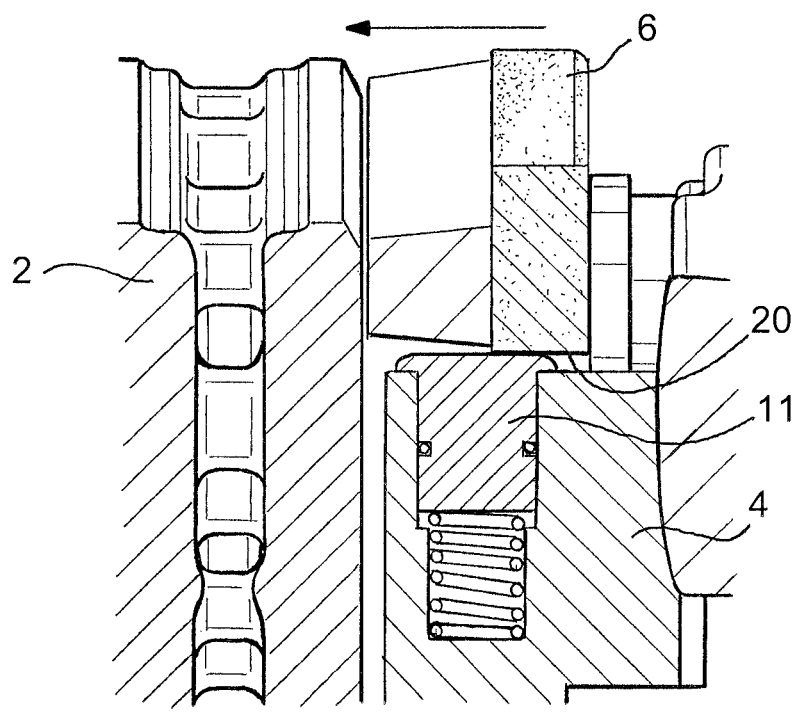
FIG. 7 is an elevation cross-section view of a new brake pad in the fully installed position installation in the brake pad carrier in FIG. 2.
Figure 9:
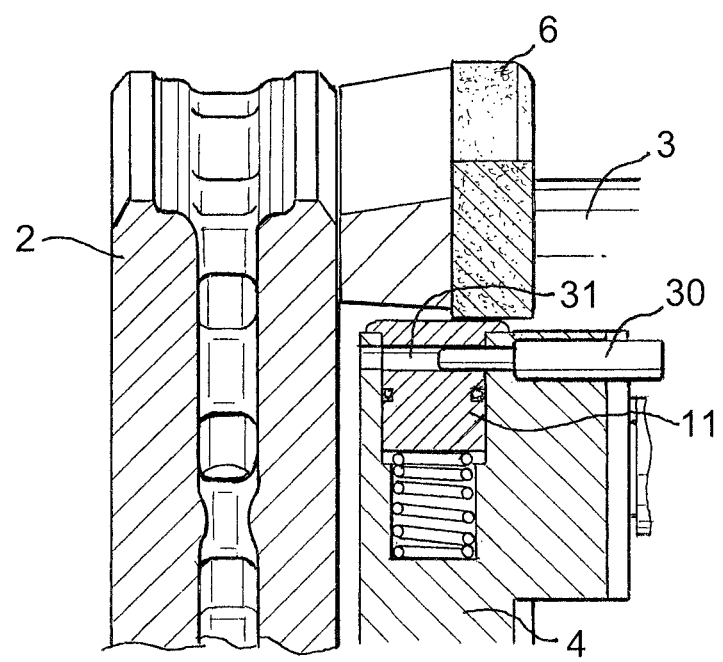
FIG. 9 is an elevation an elevation cross-section view of a brake pad carrier with a plunger cross-pin in accordance with an embodiment of the present invention.
Figure 10:
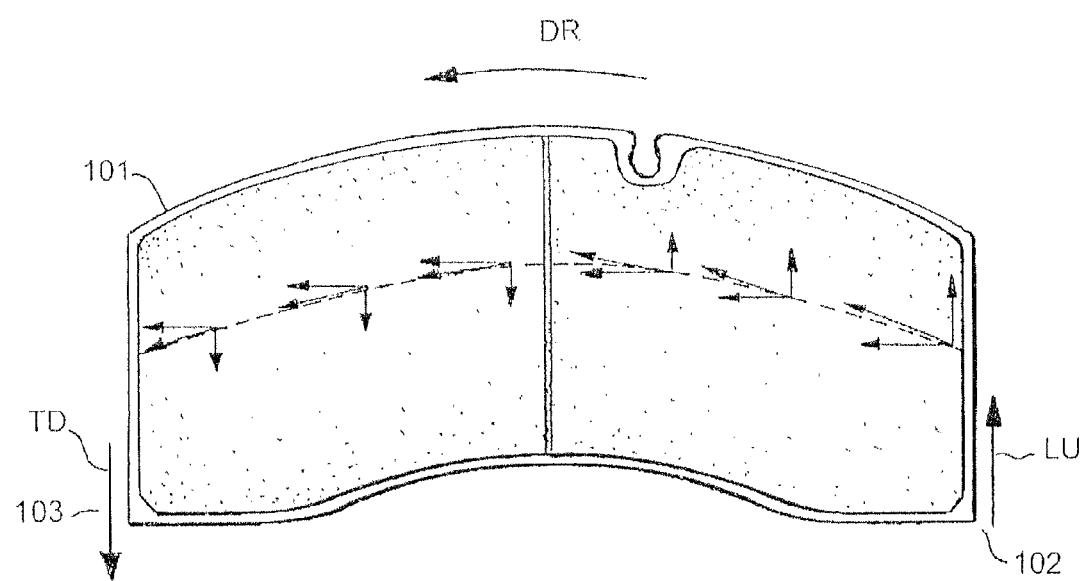
FIG. 10 is a force diagram of forces acting on a brake pad during brake operation.

The brake pad 6 continues to be advanced toward the brake disc 2, over the tops of the plungers 11 to the new brake pad installed position shown in FIG. 7. During the installation, the biasing plungers 11 may be restrained to prevent interference with the axial advancing of the brake pad, for example by manually depressing the plungers or by capturing the plungers within the bores by cross-pins or other structure such as a set screw or a lever. An example of such a cross-pin is shown in FIG. 9, where cross-pin 30 has been inserted into plunger cross-bore 31 to remove the upward biasing force of the plunger 11 during the brake pad installation. Alternatively, the edges of the plungers 11 and/or the lateral surfaces 20 of the brake pad may be configured such that the brake pad depresses the plungers as it is advanced toward the brake disc. Preferably, a plunger-capturing cross-pin or similar component would have an axial length sufficiently long to prevent the brake caliper from being returned toward the brake disc to its in-service brake application position if the cross-pins are inadvertently left in place, thereby preventing brake pad installation.

Figure 8:
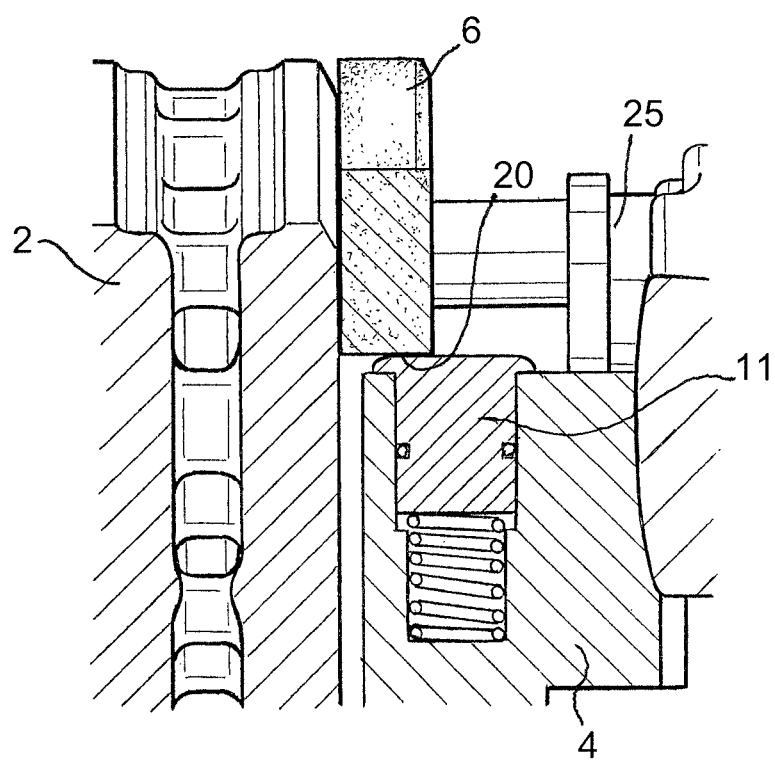
FIG. 8 is an elevation cross-section view of a worn brake pad in the brake pad carrier in FIG. 2.

FIGS. 7 and 8 (the latter illustrating the position of a fully-worn brake pad 6), show that the plungers 11 need not be sized so large that the full breadth of their upper surfaces are always in full contact with the brake pad lateral surfaces 20 during brake operation. Instead, the plungers 11 and the lateral surfaces 20 need only be sized to cooperate with one another with sufficient overlap to maintain the desired upward biasing forces without binding at any brake pad position between the new and fully-worn positions.

The present invention is not limited to this single arrangement of mount horn and brake pad shapes, nor is it limited to upward-biasing features on the inboard side of the brake pad carrier.

The foregoing disclosure has been set forth merely to illustrate the invention and is not intended to be limiting. Because such modifications of the disclosed embodiments incorporating the spirit and substance of the invention may occur to persons skilled in the art, the invention should be construed to include everything within the scope of the appended claims and equivalents thereof.

LISTING OF REFERENCE LABELS 1 disc brake
2 brake disc
3 brake caliper
4 carrier mount
5 actuator mounting face
6 brake pad
7 aperture
8 mount horn
9 brake pad abutment surface feature
10 carrier mount inboard side
11 upward biasing plunger
12 vertical bore
14 abutment surface wedge
15 spring
16 O-ring
17 plunger groove
20 brake pad lateral surface
23 brake pad backing plate
24 brake pad friction material
25 brake application device
30 cross-pin
31 plunger cross-bore

What is claimed is:

1. A brake pad motion suppression system for a disc brake, comprising:
   a brake caliper;
   a brake pad;
   a carrier mount having a mount horn having a brake pad abutment surface configured to receive the brake pad, the mount horn being located on a radially outward-facing side of the carrier mount which faces away from a rotation axis of a brake disc of the disc brake; and
   a brake pad biasing structure located at least partially in a radially outward-facing bore in a radially-outward end of the mount horn,
   wherein
      a lateral side of the brake pad and the brake pad abutment surface of the carrier mount have complementary brake pad retention features configured to retain the brake pad in the disc brake in a radially outward direction,
      the brake pad biasing structure biases the retention feature of the brake pad in the radially outward direction against the retention feature of the brake pad abutment surface, and
      the brake pad biasing structure includes a biasing feature arranged to apply a radially-outward biasing force to a radially-inward-facing surface of the brake pad that extends laterally over the radially-outward end of the mount horn.

2. The brake pad motion suppression system of claim 1, wherein
   the brake pad biasing feature includes a plunger configured to be located in the radially-outward oriented bore of the mount horn radially beneath the laterally-extending portion of the brake pad backing plate.

3. The brake pad motion suppression system of claim 2, wherein
   the brake pad biasing structure includes a spring configured to bias the plunger in the radially-outward direction against a radially-inner surface of the laterally-extending portion of the brake pad backing plate.

4. The brake pad motion suppression system of claim 3, wherein
   at least one of the plunger and the mount horn bore includes a circumferential groove configured to receive an O-ring located between the plunger and the mount horn bore.

5. The brake pad motion suppression system of claim 4, wherein
   the O-ring is configured to at least one of permit passage of air into and permit passage of air out of a region of the mount horn bore radially below the plunger while excluding solids and liquids.

6. The brake pad motion suppression system of claim 3, wherein
   at least one of the plunger and the mount horn are configured to receive a plunger retraction device configured to prevent application of the radially-outward biasing force to the brake pad.

7. The brake pad motion suppression system of claim 6, wherein
   the plunger retraction device is a pin insertable into a cross-bore of the mount horn and engageable into a recess of the plunger.

8. The brake pad motion suppression system of claim 4, wherein
   a region of the mount horn bore radially below the plunger is vented to atmosphere.

9. The brake pad motion suppression system of claim 2, wherein
a region of the mount horn bore radially below the plunger is vented to atmosphere.

10. The brake pad motion suppression system of claim 1, wherein
the brake pad retention feature of the brake pad abutment surface is wedge-shaped.

11. A brake pad carrier of a disc brake motion suppression system, comprising:
a carrier frame configured to straddle a brake disc of a disc brake when in an installed position in a disc brake;
at least two carrier mount horns of the carrier frame located on a radially outward-facing side of the carrier frame facing away from a rotation axis of the brake disc, each mount horn including a brake pad abutment surface configured to cooperate with a respective adjacent lateral surface of a brake pad to limit brake pad motion in a direction radially-outward relative to a rotation axis of the brake disc and in a lateral direction parallel to a rotation plane of the brake disc when the brake pad is in an installed position in the carrier frame; and
a carrier frame brake pad biasing structure located at least partially in a radially outward-facing bore in a radially-outward end of each mount horn,
wherein
the respective lateral side of the brake pad and the adjacent brake pad abutment surface of the respective mount horn have complementary surface features configured to retain the brake pad in the radially outward direction,
the brake pad biasing structure is configured to bias a face of the respective surface feature of the brake pad in the radially outward direction against a face of the surface feature of the respective brake pad abutment surface when the brake pad is in the installed position in the carrier frame, and
the brake pad biasing structure includes a brake pad biasing feature arranged to apply a radially-outward biasing force to a radially-inward-facing surface of the brake pad that extends laterally over the radially-outward end of each mount horn.

12. The brake pad carrier of claim 11, wherein
the brake pad biasing feature includes a plunger configured to be located in the radially-outward oriented bore of the adjacent respective mount horn radially beneath the laterally-extending portion of the respective brake pad backing plate.

13. The brake pad carrier of claim 12, wherein
the brake pad biasing structure includes a spring configured to bias the plunger in the radially-outward direction.

14. The brake pad carrier of claim 13, wherein
at least one of the plunger and the respective mount horn bore includes a circumferential groove configured to receive an O-ring located between the plunger and the respective mount horn bore.

15. The brake pad carrier of claim 14, wherein
the O-ring is configured to permit passage of air into a region of the respective mount horn bore radially below the plunger while excluding solids and liquids.

16. The brake pad carrier of claim 13, wherein
the surface feature of the respective brake pad abutment surface is wedge-shaped.

17. The brake pad carrier of claim 13, wherein
at least one of the plunger and the respective mount horn are configured to receive a plunger retraction device configured to prevent application of the radially-outward biasing force to the brake pad.

18. The brake pad carrier of claim 12, wherein
a region of the respective mount horn bore radially below the plunger is vented to atmosphere.

19. A brake pad for a disc brake having a brake caliper configured to receive a brake pad in a radial direction through an opening that straddles a brake disc, the brake pad comprising:
a brake pad backing plate having at least one brake pad retaining feature on each lateral side of the backing plate and a laterally-outward extending portion on each side of the backing plate; and
a brake pad lining material affixed to a brake disc-side of the brake pad backing plate,
wherein
each of the lateral brake pad retaining features has a vertical height extending in a direction between top and bottom edges of the brake pad backing plate, a lateral width extending in a circumferential direction of the brake pad backing plate and a thickness extending in a direction parallel to a rotation axis of the brake disc when the brake pad is in an installed position,
the width and the thickness of each of the lateral brake pad retaining features are dimensioned to allow the brake pad to be inserted radially through the brake caliper opening into a radially-oriented brake pad insertion feature of the disc brake adjacent to a side of the caliper opening furthest away from the brake disc,
the height, the width and the thickness of each of the lateral brake pad retaining features are dimensioned to allow the brake pad, following radial insertion through the brake caliper opening, to be advanced toward the brake disc and engage into at least one lateral brake pad receiving feature of the disc brake,
the laterally-outward extending portions are configured to extend laterally over mount horns of a brake pad carrier when in an installed position in the disc brake, and
the laterally-outward extending portions include a surface feature in the form of at least one of an indentation or a projection configured to cooperate with a complementary surface feature of the disc brake located at a radially-outward end of the mount horn facing away from the rotation axis of the brake disc in a manner that biases the brake pad in a radially-outward direction.

20. A method for installing a brake pad into a disc brake comprising a brake caliper, a brake pad carrier and a brake disk, the caliper being configured to straddle the carrier and the disk, the brake pad carrier having radially-outward brake pad biasing features facing away from a rotation axis of the brake disk, the radially-outward brake pad biasing features being located at least partially in a radially outward-facing bore in radially-outer ends of carrier mount horns, and the brake pad having a radially outer and a radially inner edge and opposing lateral edges between the radially outer and inner edges and a laterally-outward extending portion on each side of the backing plate configured to extend over the radially-outward brake pad biasing features, comprising the acts of:

aligning the brake pad with at least one radially-oriented brake pad insertion feature in the disc brake, the brake pad being oriented as when the brake pad is in an installed position and having at least one pad retention feature on at least one lateral edge of the brake pad, the at least one pad retaining feature on at least one lateral edge of the brake pad being configured to retain the brake pad against radially outward motion when the brake pad is in the installed position;

moving the brake pad in a radially-inward direction through a brake pad opening of the brake caliper when the brake caliper is in an operating position on the disc brake while maintaining the brake pad oriented as when in the installed position until the at least one pad retention feature of the brake pad is aligned with at least one lateral brake pad receiving feature of the disc brake oriented parallel to a brake disk rotation axis;

moving the brake pad toward the brake disk while depressing the radially-outward brake pad biasing features to permit the brake pad laterally-outward extending portions to pass over at least a portion of each of the radially-outward brake pad biasing features as the at least one brake pad retention feature engages with the at least one lateral brake pad receiving feature.

* * * * *